US009422671B2

(12) United States Patent
Trezzi et al.

(10) Patent No.: US 9,422,671 B2
(45) Date of Patent: Aug. 23, 2016

(54) PROCESS OF MAKING AQUEOUS DISPERSIONS OF POLYMERS, EMULSIONS OF POLYMERS, AND USE THEREOF

(75) Inventors: Fabio Trezzi, Puteaux (FR); Hervé Adam, Clarksburg, NJ (US)

(73) Assignee: Rhodia Operations, Aubervilliers (FR)

( * ) Notice: Subject to any disclaimer, the term of this patent is extended or adjusted under 35 U.S.C. 154(b) by 938 days.

(21) Appl. No.: 12/301,989

(22) PCT Filed: May 23, 2007

(86) PCT No.: PCT/EP2007/055021
§ 371 (c)(1),
(2), (4) Date: Jun. 25, 2009

(87) PCT Pub. No.: WO2007/135176
PCT Pub. Date: Nov. 29, 2007

(65) Prior Publication Data
US 2010/0279134 A1 Nov. 4, 2010

(30) Foreign Application Priority Data

May 24, 2006 (EP) .................................. 06290860

(51) Int. Cl.
| B32B 27/10 | (2006.01) |
| C08L 41/00 | (2006.01) |
| D21H 19/58 | (2006.01) |
| C08F 2/26 | (2006.01) |
| C08F 236/10 | (2006.01) |
| C08F 257/02 | (2006.01) |
| C09D 125/14 | (2006.01) |
| C08F 212/08 | (2006.01) |

(52) U.S. Cl.
CPC ........... *D21H 19/58* (2013.01); *C08F 2/26* (2013.01); *C08F 236/10* (2013.01); *C08F 257/02* (2013.01); *C09D 125/14* (2013.01); *C08F 212/08* (2013.01); *Y10T 428/31895* (2015.04)

(58) Field of Classification Search
CPC ........ C08F 2/26; C08F 236/10; C09D 125/14

USPC ...................................................... 524/745, 747
See application file for complete search history.

(56) References Cited

U.S. PATENT DOCUMENTS

| 3,575,913 | A |   | 4/1971  | Meier |
| 3,975,338 | A | * | 8/1976  | Tsubota et al. ................ 526/345 |
| 4,069,188 | A |   | 1/1978  | Canard et al. |
| 4,130,691 | A |   | 12/1978 | Canard et al. |
| 4,239,669 | A | * | 12/1980 | Scott et al. ..................... 524/457 |
| 4,327,004 | A | * | 4/1982  | Schmidt et al. ................ 524/745 |
| 4,346,203 | A | * | 8/1982  | Schmidt et al. ................ 526/225 |
| 4,358,403 | A | * | 11/1982 | Distler et al. .................. 524/745 |
| 4,424,298 | A | * | 1/1984  | Penzel et al. ................... 524/747 |
| 5,705,538 | A | * | 1/1998  | Morozov et al. ................ 521/89 |
| 5,910,534 | A |   | 6/1999  | Ostrowicki et al. |
| 6,380,302 | B1 | * | 4/2002  | Ikenaga et al. ................ 524/747 |
| 6,534,597 | B2 | * | 3/2003  | Adam et al. .................... 525/340 |
| 6,870,001 | B2 | * | 3/2005  | Wulff et al. .................... 524/722 |
| 2002/0013430 | A1 | * | 1/2002  | Klaerner et al. ................. 526/75 |
| 2006/0047061 | A1 | * | 3/2006  | Van Es et al. .................. 524/556 |
| 2006/0148981 | A1 | * | 7/2006  | Schmidt-Thummes et al. ............................. 524/745 |
| 2010/0240822 | A1 | * | 9/2010  | Trezzi et al. ................... 524/543 |

FOREIGN PATENT DOCUMENTS

| GB | 1 498 467       |   | 1/1978 |
| WO | WO 2004/060943  | * | 7/2004 |

OTHER PUBLICATIONS

Marangoni et al. Langmuir 1991, 7, pp. 2083-2088.*
International Search Report for International Application No. PCT/EP2007/055021 completed Sep. 5, 2007.

* cited by examiner

*Primary Examiner* — Michael A Salvitti
(74) *Attorney, Agent, or Firm* — Hunton & Williams LLP

(57) ABSTRACT

The present invention relates to a process of making aqueous dispersions of copolymers, for example based on conjugated, aliphatic dienes and vinyl aromatic compounds. It relates also to the emulsions polymers obtained thereby, and to the use thereof as binders for the coating of paper. The invention also related to a coated paper having a coating comprising the emulsion copolymer. The process involves using at least two emulsifiers.

22 Claims, No Drawings

PROCESS OF MAKING AQUEOUS DISPERSIONS OF POLYMERS, EMULSIONS OF POLYMERS, AND USE THEREOF

CROSS REFERENCE TO RELATED APPLICATIONS

This application is the U.S. National Phase Application of International Application No. PCT/EP2007/055021 filed May 23, 2007, which claims the benefit of European Patent Application No. EP 06290860.3, both of which are incorporated herein by reference.

The present invention relates to a process of making aqueous dispersions of polymers, for example copolymers based on conjugated, aliphatic dienes and vinyl aromatic compounds. It relates also to the emulsions polymers obtained thereby, and to the use thereof as binders for paper coatings. The invention also relates to a coated paper having a coating comprising the emulsion copolymer. The process involves using at least two emulsifiers.

BACKGROUND OF THE INVENTION

Aqueous dispersions of polymers, for example copolymers based on conjugated, aliphatic dienes and vinyl aromatic compounds are known (see, for example, DE-A 26 02 445, DE-A 26 02 444, U.S. Pat. No. 3,575,913). The aqueous polymer dispersions are conventionally stabilised using known emulsifiers or protective colloids which are known to the person skilled in the art (Houben-Weyl, Methoden der org. Chemie, Vol. XIV/1, 1961, Stuttgart). Examples of these are polyglycol ethers, sulphonated paraffin hydrocarbons, higher alkyl sulphates (such as, for example, lauryl sulphate), alkali metal salts of fatty acids, such as sodium stearate or sodium oleate, salts of sulphonated arylaromatics such as, for example, sodium dodecylbenzenesulphonate, ethoxylated $C_4$-$C_{12}$ alkylphenols and their sulphonation products and esters of sulphosuccinic acid. Examples of protective colloids are alkyl-hydroxyalkyl celluloses, partly or completely hydrolysed polyvinyl alcohols and copolymers of the same, acrylic acid, homopolymers and copolymers and partly neutralised salts of the same, acrylamide copolymers, polyacrylate copolymers and salts of the same, carboxyalkyl celluloses such as, for example, carboxymethyl celluloses and salts thereof, and water-soluble starch derivatives. Other examples of known emulsifiers include sulphuric acid half-ester of an ethoxylated fatty alcohol, as described in document U.S. Pat. No. 5,910,534.

Such polymers, especially copolymers often referred to as "Styrene-Butadiene" copolymers, can be used as binders in for paper coatings.

There is a need for dispersions of polymers and/or processes for making the same, that have the following properties:

toxicological or ecotoxicological profile of emulsifiers considered as good, especially considered as better than the profile of diphenylene oxide disulfonates.

a low grit amount. Grit is a consequence of coarse particles in the polymer dispersion that alter the aspect once it is coated. If grit is too high the coating has a bad aspect, thus the polymer dispersion might have to be filtered, which is long and expensive. Grit is also referred to as coagulum.

a high whiteness and/or low color index (low yellow index), a high ability of a coating to remain on paper upon printing processing, for example upon printing. A high dry pick-up value can typically represent this ability.

and/or combinations or compromise of the above, such as color and dirt pick-up.

Further properties that are of value, alone and/or combined with the above include:

acceptable rheological properties for example to allow high speed coating, good particle size control during polymerization.

SUMMARY OF THE INVENTION

The present invention presents an improvement in relation to at least some of the above-mentioned properties.

Thus the invention relates to an emulsion polymerization process for producing an aqueous dispersion of polymer, the process comprising combining hydrophobic monomers in the presence of water, initiator(s) and at least one emulsifier (g), wherein the emulsifier (g) comprises:

(g1) at least one sulphuric acid, or salt thereof, half-ester of an ethoxylated fatty alcohol having a number-average number of ethoxy groups of $n_1$ (g2) at least one sulphuric acid, or salt thereof, half-ester of an ethoxylated fatty alcohol having a number-average number of ethoxy groups of $n_2$, wherein:

$n_2 \geq n_1 + a \times n_1$ ("a multiplied by $n_1$")

$a \geq 0.5$, preferably $a \geq 1$, and $n_1 > 0$, preferably $n_1 \geq 2$.

The invention also concerns a dispersion of polymer (or "emulsion polymer") obtainable by the process, that comprises the emulsifiers (g1) and (g2).

The invention also concerns the use of the dispersion of polymer (or "emulsion polymer") as a binder for the coating of paper.

The invention also concerns a coated paper having a coating comprising the emulsion polymer.

DETAILED DESCRIPTION OF THE INVENTION

Definitions

A "fatty alcohol" is understood as an alcohol having a hydrocarbon group having least 6 carbon atoms. The hydrocarbon group can be a linear or branched, saturated or unsaturated hydrocarbon group, or a mixture thereof, preferably an alkyl group, or a mixture comprising an alkyl group. The alcohol can be of synthetic, mineral, animal or vegetal origins. The fatty alcohol would typically have formula $R^1$—OH wherein $R^1$ is the hydrocarbon group mentioned above (also referred to as the fatty alcohol rest), or a mixture of different such hydrocarbon groups.

An association of at least two emulsifiers is understood as the use of at least two emulsifiers wherein at least two of the at least two emulsifiers are introduced separately for combination with other components such as monomers. The association is understood as opposed to a mixture or premix or blend of emulsifiers wherein at least two of the at least two emulsifiers are mixed together before combination with other components such as monomers.

Emulsifier (g)

Emulsifier (g) comprises at least two emulsifiers: emulsifier (g1) and emulsifier (g2). Emulsifier (g) can be also referred to as a surfactant. Emulsifiers (g1) and (g2) can be individually referred to as surfactants. Thus emulsifier (g) can also be referred to as a surfactant mixture or association. In the polymerization process, emulsifiers (g1) and (g2) can be introduced separately in a polymerization vessel, or as a mixture, for example from a stock recipient where they have been mixed. In such a stock recipient they can have been introduced separately or as a mixture. Such a mixture is also referred to as a surfactant concentrate or a surfactant blend or a surfactant premix.

A half-ester of an ethoxylated fatty alcohol having a number-average number of ethoxy groups of n has typically formula $R^1$—O—$[CH_2$—$CH_2$—$O]_n$—$SO_3^-X^+$ wherein $R^1$ is the fatty alcohol rest, having the definition above, n is the number-average number of ethoxy groups, and X is selected from H (acid form), $NH_4$ (ammonium salt form), or an alkaline atom such as Na or K (alkaline salt form).

The half-ester of an ethoxylated fatty alcohol is preferably used in a Na salt form.

The number-average number of ethoxy groups n (respectively $n_1$ and $n_2$), is usually determined by the number of moles used to ethoxylate one mole of fatty alcohol. This is typically provided by the manufacturer.

The emulsifiers (g1) and (g2) are preferably such that a mixture consisting essentially of (g1) and (g2) exhibits an ethoxylate (number) distribution plot showing at least two maxima. The plot can be determined with common analysis methods involving a chromatography separation (for example gas chromatography) and detection means (for example mass spectrometry). Individually an emulsifier (g1) (resp. (g2)) would exhibit an ethoxylate (number) distribution plot showing a single maximum, typically at the number-average number of ethoxy groups $n_1$ (resp. $n_2$). Typically an emulsifier (g1) (resp. (g2)), individually, exhibits an ethoxylate (number) distribution plot showing at least 10% by number, preferably at least 50%, of molecules within a plotted zone of $[n_1-b_1n_1]$ to $[n_1+b_1n_1]$ (resp of $[n_2-b_2n_2]$ to $[n_2+b_2n_2]$) wherein b is 0.5, preferably 0.25, preferably 0.10. Usually and typically the higher $n_1$ (resp. $n_2$) is, the higher $b_1$ (resp. $b_2$) is. $b_1$ and $b_2$ can be identical or different.

The number-average numbers $n_1$ and $n_2$ of ethoxy groups of the two emulsifiers (g1) and (g2) are as follows:

$n_2 \geq n_1 + a \times n_1$ $a \geq 0.5$, preferably $a \geq 1$, and $n_1 > 0$, preferably $n_1 \geq 2$.

In some embodiments a, $n_1$ and $n_2$ can be such that $a \geq 1$, $a \geq 2$, $a \geq 3$, $a \geq 4$, or $a \geq 5$.

According to some particular embodiments:

$n_1$ is of from 2 to 7 and $n_2$ is of higher than or equal to 10, preferably of from 10 to 20, or $n_1$ is of from 7 to 20, and $n_2$ is of higher than or equal to 25, preferably of from 25 to 35, or $n_1$ is of from 2 to 7 and $n_2$ is of higher than or equal to 20, preferably of from 25 to 35.

The fatty alcohol of emulsifiers (g1) and (g2), identical or different, is preferably a fatty alcohol having a weight-average number of carbon atoms of from 8 to 30, preferably of from 10 to 18, preferably of from 12 to 16. It can be for example an alkyl group having a weight-average number of carbon atoms of from 8 to 30, preferably of from 10 to 18, preferably of from 12 to 16. It can be for example a group commonly referred to as a lauryl group, a group commonly referred to as a coco group, a group commonly referred to as $C_{12}$ alkyl group, a group commonly referred to as $C_{14}$ alkyl group, a group commonly referred to as $C_{12}$-$C_{14}$ alkyl group, a group commonly referred to as $C_{14}$-$C_{16}$ alkyl group, or a mixture thereof. Preferably emulsifier (g) comprises at least 75% by weight, preferably at least 90% by weight of emulsifiers (g1) and (g2).

The weight ratio between emulsifier (g1) and emulsifier (g2) is preferably of from 25/75 to 75/25, preferably of from 40/60 to 60/40.

In one embodiment emulsifier (g1) and emulsifier (g2) are provides as a premix. It can be also referred to as a blend of emulsifier (g1) and (g2). The premix or blend comprises at least 75% by weight, preferably at least 90% by weight of emulsifiers (g1) and (g2). The premix is then typically combined with other components used in the polymerization process, such as the monomers.

Aqueous Dispersions of Polymers and Emulsion Polymerization Processes

Aqueous dispersions of polymers obtained by emulsion polymerization of hydrophobic monomers in the presence of water are often referred to as latexes. Latexes, polymers obtained by emulsion polymerizations, monomers or mixtures or associations of monomers therein or thereto, are known by the one skilled in the art. The monomers used comprise hydrophobic monomers. It is though not excluded that monomers used comprise some hydrophilic monomers associated or mixed with the hydrophobic monomers. Such hydrophilic monomers, if present are typically used in an amount of less then 40% by weight, for example less than 30%, for example less than 20%. The polymer is typically different from polyvinylchloride, preferably different from any chloride-containing polymer.

The polymers can for example be polymers referred to as:

Acrylic based latexes

Styrene/Acrylic based latexes

Vinyl/Acrylic based latexes vinyl chloride based latexes

Styrene/Acrylonitrile (SAN) based latexes

Butadiene based latexes

Vinyl acetate based latexes

Vinyl Veova based latexes

Styrene/butadiene based latexes

Vinyl acetate/Veova based latexes

In the above "based" means that the polymer chains comprise at least 33% by weight, preferably at least 50% by weight of the monomers mentioned before. If two monomers or monomer families are mentioned it is preferred that the weight ratio between them be of from 5/95 to 95/5, preferably from 10/90 to 90/10. Of course some further different monomers can be used.

In a particularly useful embodiment of the invention, the polymer is a copolymer obtained from:

(a) from 20 to 80 parts by weight of conjugated aliphatic dienes, (b) from 20 to 80 parts by weight of vinyl aromatic compounds, (c) optionally, up to 10 parts by weight of ethylenically unsaturated carboxylic acids and/or dicarboxylic acids, preferably from 0.1 to 10 parts by weight, (d) optionally, up to 20 parts by weight of ethylenically unsaturated carboxylic acid nitriles, (e) optionally, up to 20 parts by weight of copolymerizable vinyl compounds, different from component (b).

Some of these polymers are often referred to as "Styrene/Butadiene" latexes, as monomer (a) is typically butadiene and monomer (b) is typically styrene.

Emulsion polymerization processes leading to aqueous dispersions of polymers are known by the one skilled in the art. These processes typically involve combining water initiator(s) and hydrophobic monomers, in the presence of at least one emulsifiers, for example a surfactant. These processes are often referred to as latex processes. Any process can be used, including:

so called seeded processes or non-seeded processes, processes with progressive or non progressive introduction of monomers, processes with progressive or non progressive introduction of surfactants, processes using water-soluble initiators or water-insoluble initiators, and/or processes involving introduction of a pre-emulsion of monomers, said pre-emulsion optionally comprising at least one emulsifier, for example a surfactant, processes that combine some of the above.

Initiators that can be use are known by the one skilled in the art. Examples mentioned in particular are organic and/or inorganic peroxides, such as alkali metal peroxydisulphates, persulfates and/or azo compounds, or combined systems composed of at least one organic reducing agent and at least one peroxide and/or hydroperoxide such as, for example, tert. butyl hydroperoxide and the sodium salt of hydroxymethanesulphinic acid, or hydrogen peroxide and ascorbic acid, or combined systems containing in addition a small quantity of a metal compound which is soluble in the polymerisation medium and the metallic component of which can be present in several valence states, for example, ascorbic acid/iron(II) sulphate/hydrogen peroxide. In the latter example, the sodium metal salt of hydroxymethanesulphinic acid, sodium sulphite, sodium hydrogen sulphide and/or sodium metal disulphite are also frequently used instead of ascorbic acid, and tert. butyl hydroperoxide or alkali metal peroxydisulphates and/or ammonium peroxydisulphate instead of hydrogen peroxide. A combination of water-soluble Fe/V-salts is frequently used instead of a water-soluble iron(II) salt.

Preferred water-soluble initiators include at least one compound selected from the group consisting of organic peroxides, inorganic peroxides, and azo compounds.

The initiator system, according to its consumption in the course of the radical aqueous emulsion polymerisation, may be added continuously or gradually. This depends in particular, in a known per se manner, both on the chemical nature of the initiator system and on the polymerisation temperature. Peroxides, for example, alkali metal peroxydisulphates such as sodium peroxydisulphate or ammonium peroxydisulphate are particularly preferred.

The most favourable quantity of water-soluble initiators can easily be determined by appropriate preliminary tests. Conventionally the water-soluble initiators are added in a quantity of from 0.1 to 2.0 wt. %, referred to the total mass of the monomers being polymerised.

Furthermore, the known molecular-weight controllers such as mercapto compounds, for example, tertiary dodecyl mercaptan or dimeric α-methylstyrene, can still be added for the emulsion polymerisation according to the invention. In addition still further auxiliary substances such as complexing agents, for instance, to control interfering metal ions, and inhibitors, for example hydroquinone monomethyl ether, can be added to the emulsion polymerisation. The molecular-weight controllers and the auxiliary substances are known and are described, for example, in Houben-Weyl, Methoden der organischen Chemie, Vol. XIV/1, page 297 ff., 1961, Stuttgart.

The emulsifiers used in the polymerization process comprise emulsifier (g1), emulsifier (g2) and optionally some further emulsifiers. Preferably the emulsifiers are an emulsifier (g) that comprises at least 75% by weight, preferably at least 90% by weight of emulsifiers (g1) and (g2). Further optional emulsifiers include for example esters or half-esters of alkylpolyoxyethylene sulphosuccinates can be used as emulsifiers. Here the sulphosuccinic acid is esterified singly or doubly with poly- or oligoethylene oxide having 2 to 30 ethylene oxide units, preferably 2 to 20 ethylene oxide units, in particular 2 to 10 ethylene oxide units, the end group of the above-mentioned esters and half-esters comprising an alkyl group having 8 to 18 carbon atoms which is straight-chain or branched. The following are mentioned in particular as alkyl groups containing $C_8$-$C_{18}$ carbon atoms: caprylic alcohol, capric alcohol, lauryl alcohol, myristyl alcohol, stearyl alcohol or elaidic alcohol.

In a particularly useful embodiment of the invention the process comprise combining in the presence of water and water-soluble initiators (a) from 20 to 80 parts by weight of conjugated aliphatic dienes, (b) from 20 to 80 parts by weight of vinyl aromatic compounds, (c) optionally, up to 10 parts by weight of ethylenically unsaturated carboxylic acids and/or dicarboxylic acids, preferably from 0.1 to 10 parts by weight, (d) optionally, up to 20 parts by weight of ethylenically unsaturated carboxylic acid nitriles, (e) optionally, up to 20 parts by weight of copolymerizable vinyl compounds, different from component (b), (f) optionally, a base, preferably in an amount sufficient to neutralize between about 1% and about 50% of carboxylic acid groups from component (c), and (g) from 0.1 to 5 parts by weight per 100 parts by weight of the sum of monomeric components (a) to (e) of emulsifiers (g1) and (g2).

In this embodiment, preferably, from 15 to 85 weight percent of emulsifier (g) are added within the time required to obtain 40% overall conversion of monomeric components (a) to (e). The conversion rate of the individual components can easily be established by determining the solids content of the dispersion by means of an evaporated sample. In a special development of the emulsion polymerisation for the preparation of the aqueous dispersion of copolymers according to the invention, it can be of advantage at the very beginning of the polymerisation to add to the reaction mixture up to 15 wt. % of the total quantity of emulsifiers used and then to add the remaining quantity, that is, up to 75 wt. %, of the total quantity of emulsifiers used within the time in which up to 40% of the overall conversion of the components used is attained.

The rate of metering the emulsifiers during the emulsion polymerisation is also governed by the intended particle size of the final polymers and by the reaction rate and can easily be determined by several preliminary tests. Here the optimum is determined from a minimal quantity of deposits (coagulate) during the polymerisation, the achievement of the required final particle size and particle distribution and the maximum stability to multivalent ions of the resulting polymer dispersion. The residual quantity of emulsifiers, that is, 85 to 15 wt. % of the total emulsifiers used, can be metered to the reaction mixture during the remaining period of polymerisation or added to the dispersion after completion of the polymerisation. Emulsifier (g) can be present in an amount of from 0.2 to 4.5 parts by weight per 100 parts by weight of the sum of components (a) to (e). The water-soluble initiator(s) can be present in an amount of from 0.1 and to 2 weight percent of the sum of components (a) to (e). Between about 30 to about 85 weight percent of the emulsifiers can be added within the time required to obtain about 40% overall conversion of monomeric components (a) to (e). The amount of base used can be an amount sufficient to neutralize between about 5% and about 45% of carboxylic acid groups from component (c).

Suitable bases are in particular aqueous solutions of alkali metal oxides or hydroxides, most preferably solutions of ammonium hydroxide, sodium hydroxide or potassium hydroxide.

Polymerisation pressure and polymerisation temperature are however of fairly minor importance. The reaction is generally carried out at temperatures of between 20° C. (room temperature) and 100° C., preferably at temperatures of 60° C. to 95° C.

After completion of the actual polymerisation process, stirring is preferably continued for several more hours with the polymerisation temperature being maintained. This can be followed by conventional steps for removing the residual monomers, for adjusting the pH value or by other methods for finally establishing particular properties.

The aqueous dispersion of a preferred polymer is obtainable preferably by emulsion polymerisation of 25 to 65 parts by weight of component a), 25 to 65 parts by weight of component b), 1 to 6 parts by weight of component c), 0 to 15 parts by weight, in particular 0 to 10 parts by weight of component d) and 0 to 15 parts by weight, in particular 0 to 10 parts by weight of component e).

Preferred conjugated aliphatic dienes (component a)) are butadiene, isoprene, 1,3-pentadiene, dimethylbutadiene and/or cyclopentadiene. Vinyl aromatic compounds (component b)) to be mentioned in particular are styrene, .alpha.-methylstyrene and/or vinyltoluene. Ethylenically unsaturated carboxylic acids and/or dicarboxylic acids (component c)) preferably used are α,β-monoethylenically unsaturated mono- and dicarboxylic acids having 3 to 6 C atoms such as, for example, acrylic acid, methacrylic acid, maleic acid, fumaric acid, itaconic acid. Ethylenically unsaturated carboxylic acid nitriles preferably mentioned are acrylonitrile and/or methacrylonitrile (component d)), and preferably mentioned copolymerisable vinyl compounds (component e)) are esters of acrylic and/or methacrylic acid wherein the alkyl group contains 22 or fewer carbon atoms. Examples of these are methyl acrylate, methyl methacrylate, ethyl(meth)acrylate, isopropyl(meth)acrylate, butyl(meth)acrylate, 2-ethylhexyl (meth)acrylate, allyl esters of saturated mono-carboxylic acids, vinyl esters, vinyl ethers, vinyl ketones, dialkyl esters of unsaturated dicarboxylic acids, vinyl acetate and/or vinylpyridine, vinyl chloride, vinylidene chloride.

The emulsifiers are used preferably in quantities of from 0.2 to 4.5 parts by weight, referred to 100 parts by weight of the above-mentioned components a) to e). The emulsifiers include emulsifier (g) comprising emulsifier (g1) and emulsifiers (g2).

Use of the Polymers

The emulsion polymers obtainable by the process above can be use as a coating or in a coating composition, especially in a paper coating composition, as a binder. The polymers, coating and/or the coated paper show at least some of the needed properties mentioned above, or a compromise thereof. In coatings application, it is preferred that the polymers have a glass transition temperature of higher than or equal to −20° C., for example of from −20° C. to 100° C., preferably of from 0° C. to 60° C.

The emulsion polymers can also be used in carpet backing, nonwoven bindings, adhesives, spray-dried powders for construction applications, including tile adhesives, mortars, cements and grouts. For example the emulsion polymers can be used as pressure sensitive adhesives. Pressure sensitive adhesives polymers can typically have a glass transition temperature of lower than −20° C., for example of from −55° C. to −20° C. Examples of pressure sensitive adhesive polymers include polymers wherein the hydrophobic monomer(s) comprise(s) butyl acrylate, for example at least 75% by weight, or even at least 90%, of butyl acrylate, with reference to the total weight of monomers. Pressure sensitive adhesives obtained with using emulsifier (g) during the polymerization procedure present especially good shear and/or cohesion strength. They also present an especially interesting low foam tendency.

Coating compositions, especially paper coating compositions comprising emulsion polymers binders are known by the one skilled in the art, who typically designs the composition in view of the need for said coating. Thus the coating composition usually comprises minerals such as titanium dioxide and/or kaolins. The coating composition usually comprises also water soluble polymers such as starch or starch derivatives, guar or guar derivatives etc. . . . .

Some illustrative but non-limiting examples are provided hereunder for the better understanding of the invention.

EXAMPLES

Emulsion polymers (latex) are prepared according to the polymerization procedure below.

Polymerization Procedure

All the quantities of the compounds given in the polymerization recipes are expressed as parts by weight, referred to a total of 100 parts of monomer used ("phm", "per hundred monomer") or in grams.

A mixture of water, seeds and surfactant is prepared in a 5 liters polymerization vessel as specified in Table 1. The seed is a polystyrene latex having a particle size of 25-45 nm.

A mixture of water, surfactant, Sodium Hydroxide an Ammonium Persulphate is prepared in the dosage tank "A" as specified in the Table 1.

A mixture of Butadiene, Styrene, Acrylic Acid and terDoDecylMercaptan (tDDM) is prepared in the dosage tank "B" as specified in the table 1.

Oxygen is removed from the polymerization vessel by at least two cycle of vacuum & nitrogen introduction, then the temperature is raised to 80° C. keeping under continuous stirring at 360 rpm.

When the 80° C. temperature is reached in the polymerization vessel, streams of the mixtures from tank "A" and tank "B" are introduced into the polymerization vessel (beginning at time $t_0$). The mixture from tank "A" is fed during 5 h30', the mixture from tank "B" is fed during 5 h.

When the addition of the mixture from tank "A" is completed, the reaction mixture is kept at 80° C. for 1 h. The latex is then stripped, cooled, and neutralized to appropriate pH (around 5) with NaOH.

TABLE 1

| | | Amount (as is) | Amount as dry matter |
|---|---|---|---|
| Polymerization Vessel | Water | 1800 g | |
| | Seeds (latex having 29.7% dry matter) | 16.2 g | 0.3 phm |
| | Surfactant | | 0.2 phm |
| Storage Tank A | Water | 0 | |
| | Surfactant | | 0.75 phm |
| | NaOH | 3.2 g | 0.20 phm |
| | Ammonium Persulphate (10% dry matter) | 192 g | 1.20 phm |
| Storage Tank B | Styrene | 944 g | 37 phm |
| | Butadiene | 592 g | 59 phm |
| | Acrylic Acid | 64 g | 4 phm |
| | tDDM | 3.2 g | 0.2 phm |

Various surfactants (or associations of surfactants) are used in the polymerization procedures. The emulsion polymers obtained are evaluated according to the evaluation procedures below.

7 different latexes are prepared with using the 7 surfactants that follow:

"4EO": lauryl alcohol ethoxylated and sulfated (Na salt)-ethoxylation with 4 moles of ethylene oxide per mole of lauryl alcohol "12EO": lauryl alcohol ethoxylated and sulfated (Na salt)-ethoxylation with 12 moles of ethylene oxide per mole of lauryl alcohol "30EO": lauryl alcohol ethoxylated and sulfated (Na salt)-ethoxylation with 30 moles of ethylene oxide per mole of lauryl alcohol "4EO+12EO": mixture of 50 wt % of "4EO" with 50 wt % of "12EO"

"4EO+30EO": mixture of 50 wt % of "4EO" with 50 wt % of "30EO"

"12EO+30EO": mixture of 50 wt % of "12EO" with 50 wt % of "30EO"

"DSB": Diphenylene Oxide Disulfonate; Rhodacal© DSB marketed by Rhodia

Coating Compositions 7 different coating compositions are prepared, containing the 7 different latexes. The compositions are the following:

| Product | Nature and Supplier | Amount as parts per hundred, dry (pph) |
|---|---|---|
| DB Plate 90 | Delaminated clay, Dry Branch Kaolin | 70 |
| Hydrosperse | Clay, JM Huber | 25 |
| Latex tested |  | 10 |
| PG 290 | Starch, Penford | 7 |
| TiPure RPS | Titanium dioxide, DuPont | 5 |
| Berset 2125 | Crosslinker, Bersen | 0.5 |
| Dispex N-40V | Dispersant, Ciba | 0.15 |
| Calsan 55 | Calcium Stearate, BASF | 0.1 |

Total solids: 61-62%.

Coated Paper

The 7 compositions are coated on paper with the following conditions:

Paper: 40 lb free sheet
Apparatus: Cylindrical Lab Coater (CLC) 6000 manufactured by SimuTech International Inc.
Coat weight: 6 lbs/3300 square feet
Speed: 2000 ft/min
Calender:
  Gloss Target for control: 60%
  Temperature: 190 F
  Pressure: 2250 pli (pounds per linear inch)

Results of evaluations are presented on table 2 below. "C" stands for "comparative".

TABLE 2

| Example | Surfactant used | Grit | DO/C | b | Dry pick-up |
|---|---|---|---|---|---|
| 1C | 4EO | 75 | 782 | 3.01 | 45 |
| 2 | 4EO + 12EO | 1 | 744 | 2.79 | 52 |
| 3C | 12EO | 64 | 847 | 2.88 | 50 |
| 4 | 4EO + 30EO | 27 | 735 | 2.91 | 46 |
| 5 | 12EO + 30EO | 42 | 943 | 2.83 | 45 |
| 6C | 30EO | 146 | 1020 | 2.79 | 44 |
| 7C | DSB | 121 | 1007 | 2.96 | 45 |

Grit Evaluation (on the Latex)

100 g of latex is diluted in water under mild stirring then filtered on a weighted 40 μm nylon web that is then dried and weighted again The amount of grit is evaluated as weight difference:

(nylon web+polymer residual)−(nylon web)

Results are expressed in ppm (based on total latex). The lower the grit is, the better.

The latexes of the invention have a good grit value.

DO/C Evaluation (on the Latex):

DO/C Stands for Optical Density/Concentration.

The absorbance (=DO) of a very diluted latex solution (of known concentration of about 350 mg of latex in 150 ml of water) is measured at 690 nm with a conventional spectomer.

The absorbance divided by the concentration is proportional to the latex particle size.

Results are expressed in $cm^2/g$ $$DO/C = (\text{Water weight} * DO * 100)/(\text{Latex weight} * \text{Latex solid }\%)$$

The DO/C of the invention are within an acceptable range.

b: Yellow Index Evaluation (on Coated Paper)

The yellow index b is measured according to CIE L*a*b* standards, following the TAPPI (Technical Association of the Pulp and Paper Industry) test method T 524, for example available on-line at www.tappi.org.

The lower the yellow index is, the better.

Dry Pick Evaluation (on Coated Paper)

The dry IGT pick is measure according to the TAPPI (Technical Association of the Pulp and Paper Industry) test method T 514. This method is sometimes also referred to as a "IGT tear resistance", using an instrument available from IGT Testing Systems. Substantially it measures the distance along which a coating is removed from paper when the paper is drummed from 0 to 4 m/s on a wheel rendered tacky with an oil Substantially it measures the distance along which a coating is removed from paper when the paper is drummed from 0 to 4 m/s on a wheel rendered tacky with an oil. The results are expressed as "velocity viscosity product" (VVP)

VPP=distance×speed×viscosity

The higher the VVP is, the better.

Wet IGT Pick

Also performed is a Wet Pick & Wet Repellence test using the IGT AIC2-5 test instrument, with the test IGT test method W32. Replication is 5MD. Ink used is a Huber pick test ink, with the relevant tack(s). The instrument and the method are available from IGT Testing Systems, including on-line at www.igt.nl.

The 7 coated papers show a good substantially equivalent Wet IGT pick.

The invention claimed is:

1. An emulsion polymerization process for producing an aqueous dispersion of a non-chloride-containing polymer, the process comprising combining hydrophobic monomers in the presence of water, at least one initiator, and at least one emulsifier,
  wherein the emulsifier comprises:
    (i) at least one sulfuric acid half-ester of an ethoxylated fatty alcohol, or a salt thereof, having a number-average number of ethoxy groups of $n_1$, and
    (ii) at least one sulfuric acid half-ester of an ethoxylated fatty alcohol, or a salt thereof, having a number-average number of ethoxy groups of $n_2$,
  wherein:
    $n_1$ is from 2 to 7 and $n_2$ is from 10 to 20,
    $n_2 \geq n_1 + a \times n_1$, and
    $a \geq 1$.

2. An emulsion polymerization process for producing an aqueous dispersion of a non-chloride-containing polymer, the process comprising combining in the presence of water and at least one water-soluble initiator
- (a) from 20 to 80 parts by weight of a conjugated aliphatic diene,
- (b) from 20 to 80 parts by weight a vinyl aromatic compound,
- (c) optionally, up to 10 parts by weight of an ethylenically unsaturated carboxylic acid and/or dicarboxylic acid,
- (d) optionally, up to 20 parts by weight of an ethylenically unsaturated carboxylic acid nitrite,
- (e) optionally, up to 20 parts by weight of a copolymerizable vinyl compound different from component (b),
- (f) optionally, a base, and
- (g) from 0.1 to 5 parts by weight per 100 parts by weight of the sum of monomeric components (a) to (e) of an emulsifier, said emulsifier comprising:
  - (i) at least one sulfuric acid half-ester of an ethoxylated fatty alcohol, or salt thereof, having a number-average number of ethoxy groups of $n_1$, and
  - (ii) at least one sulfuric acid half-ester of an ethoxylated fatty alcohol or salt thereof, having a number-average number of ethoxy groups of $n_2$, wherein
  $n_1$ is from 2 to 7 and $n_2$ is from 10 to 20,
  $n_2 \geq n_1 + a \times n_1$, and
  $a \geq 1$.

3. The process of claim 2, wherein the at least one ethylenically unsaturated carboxylic acid and/or dicarboxylic acid is present in amount ranging from 0.1 to 10 parts by weight.

4. The process of claim 2, wherein the process comprises combining said ethylenically unsaturated carboxylic acid nitrites of (d) in the presence of water and at least one water-soluble initiator.

5. The process of claim 2, wherein the process comprises combining said copolymerizable vinyl compounds of (e) in the presence of water and at least one water-soluble initiator.

6. The process of claim 2, wherein the process comprises combining said base of (f) in the presence of water and at least one water-soluble initiator.

7. The process of claim 6, wherein the base (f) is present in an amount sufficient to neutralize about 1% to about 50% of carboxylic acid groups of component (c), which is present up to 10 parts by weight of the sum of components (a) to (e).

8. The process of claim 2, wherein the base (f) is present in an amount sufficient to neutralize about 5% to about 45% of carboxylic acid groups of component (c), which is present in up to 10 parts by weight of the sum of components (a) to (e).

9. The process of claim 2, wherein from 15 to 85 weight percent of the emulsifier is added within a time required to obtain 40% overall conversion of monomeric components (a) to (e).

10. The process of claim 1, wherein the emulsifier comprises at least 75% by weight of components (i) and (ii).

11. The process of claim 1, wherein the emulsifier comprises at least 90% by weight of components (i) and (ii).

12. The process of claim 1, wherein the weight ratio between component (i) and component (ii) ranges from 25/75 to 75/25.

13. The process of claim 1, wherein the weight ratio between component (i) and component (ii) ranges from 40/60 to 60/40.

14. The process of claim 2, wherein the emulsifier is present in an amount ranging from 0.2 to 4.5 weight percent of the sum of components (a) to (e).

15. The process of claim 2, wherein the at least one water-soluble initiator is present in an amount ranging from 0.1 to 2 weight percent of the sum of components (a) to (e).

16. The process of claim 1, wherein the at least one initiator comprises at least one compound comprising an organic peroxide, inorganic peroxide, persulfate, azo compound, or mixtures thereof.

17. The process of claim 2, wherein the emulsifier is added in an amount ranging from about 30 to about 85 weight percent within a time required to obtain about 40% overall conversion of monomeric components (a) to (e).

18. The process of claim 1, wherein components (i) and (ii) are combined with one or more of the other components (a) to (e) as a premix.

19. An emulsion polymer made by the process according to claim 1.

20. An emulsion polymer made by the process according to claim 2.

21. A paper coating binder comprising the emulsion polymer of claim 20.

22. A coated paper comprising a coating comprising the emulsion polymer of claim 20.

* * * * *